Dec. 31, 1935.  L. F. NENNINGER ET AL  2,025,885

GRINDING MACHINE

Filed July 28, 1934  9 Sheets-Sheet 1

Inventors
LESTER F. NENNINGER
FREDERICK S. HAAS
By
A. H. Parsons  Attorney

Dec. 31, 1935.   L. F. NENNINGER ET AL   2,025,885
GRINDING MACHINE
Filed July 28, 1934    9 Sheets-Sheet 2
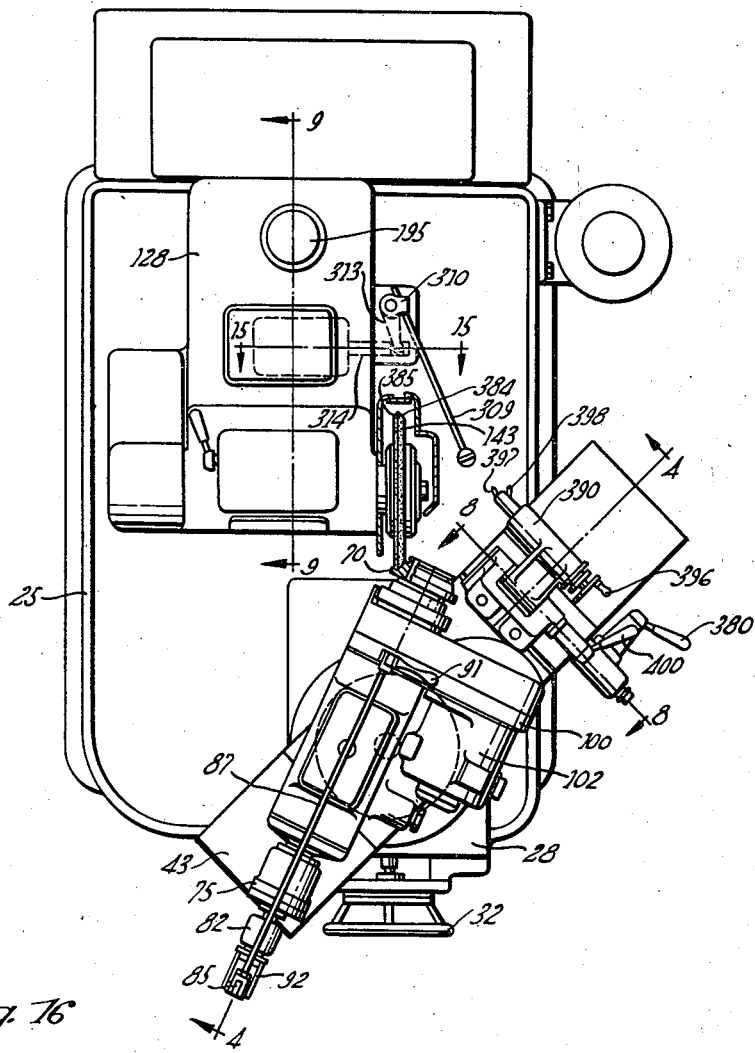
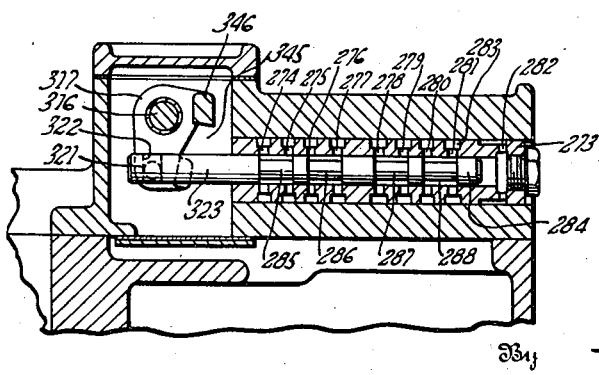
Inventors
LESTER F. NENNINGER
FREDERICK S. HAAS
By A.H. Parsons
Attorney

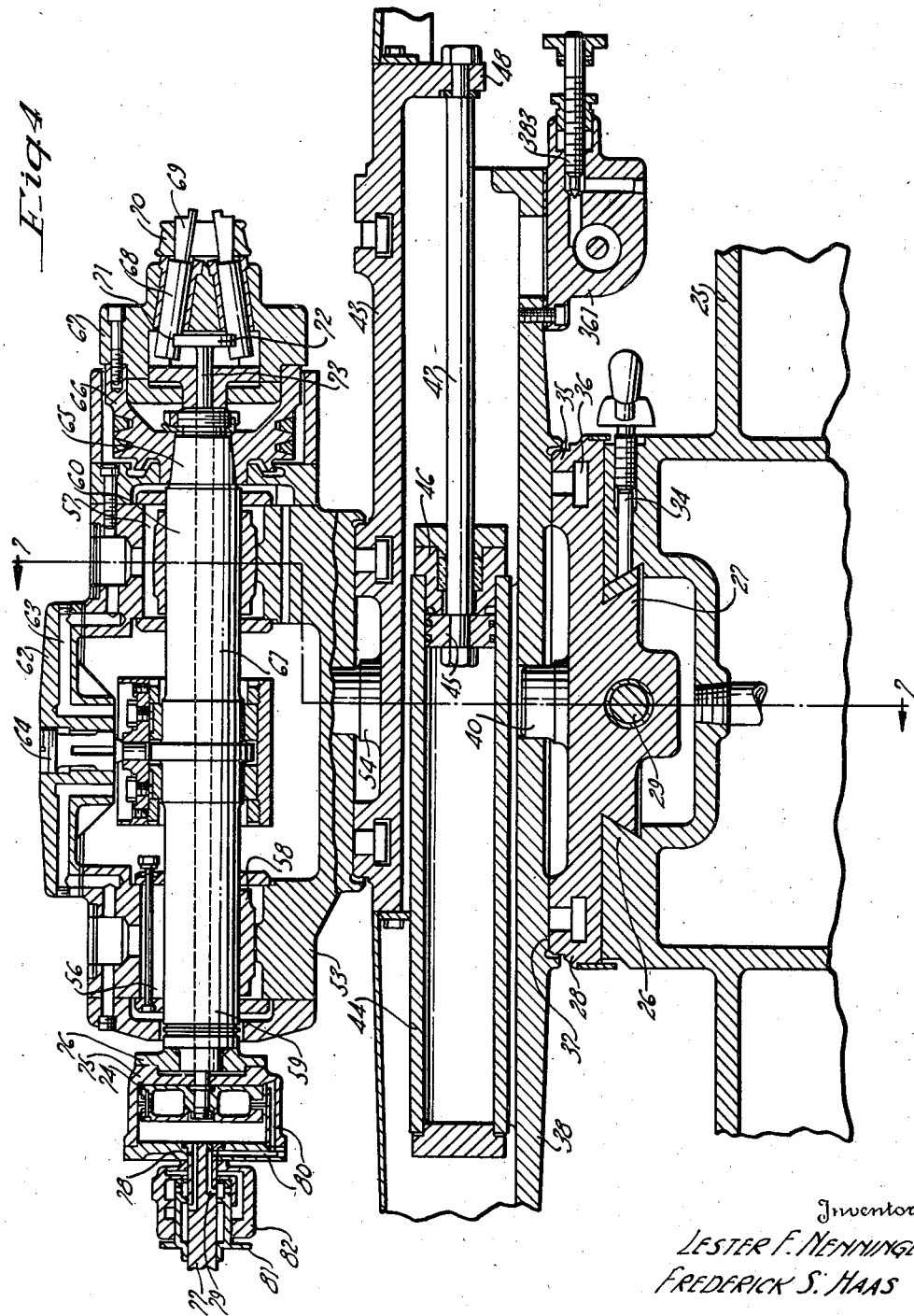

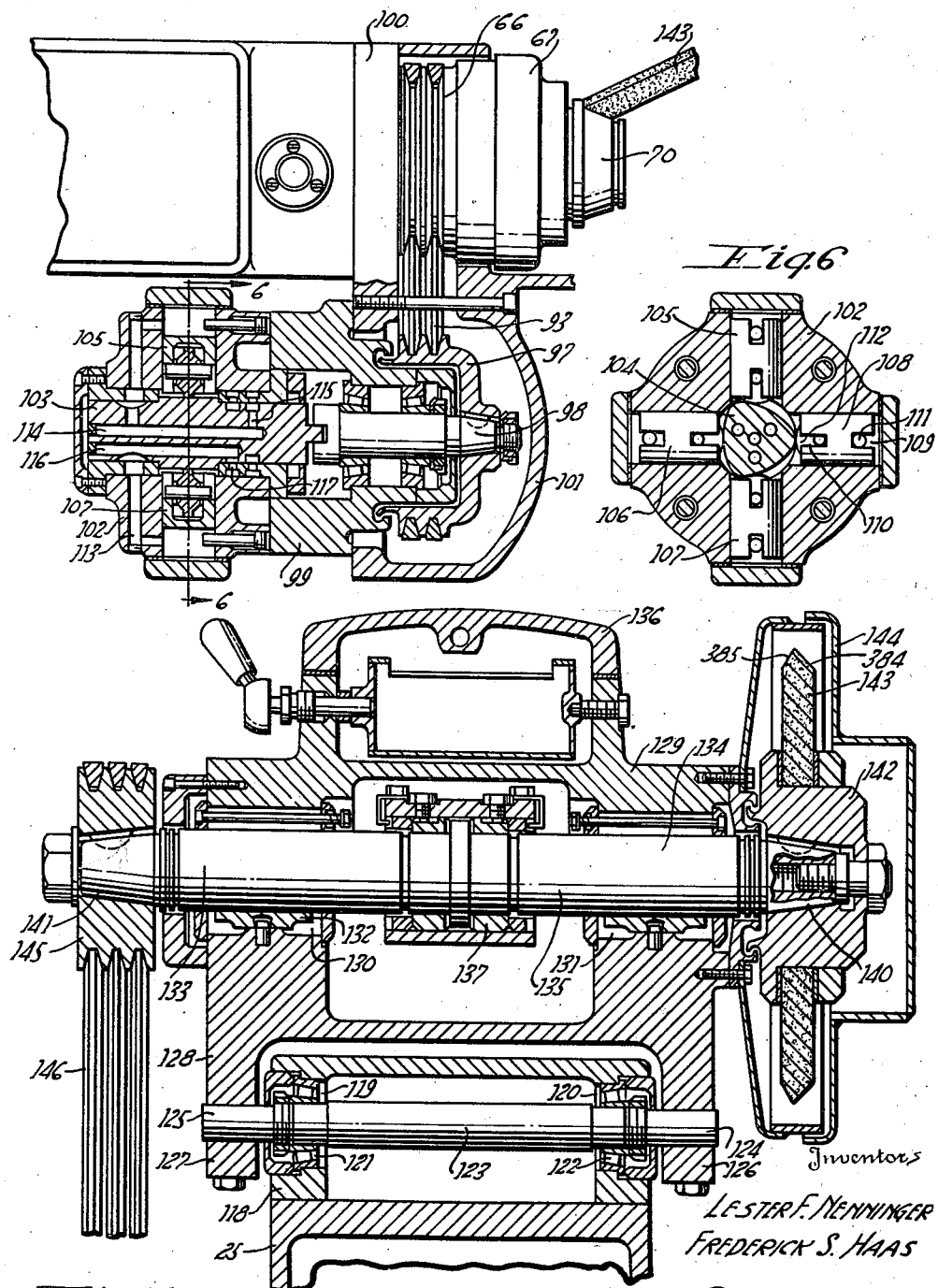

Dec. 31, 1935.  L. F. NENNINGER ET AL  2,025,885
GRINDING MACHINE
Filed July 28, 1934   9 Sheets-Sheet 5
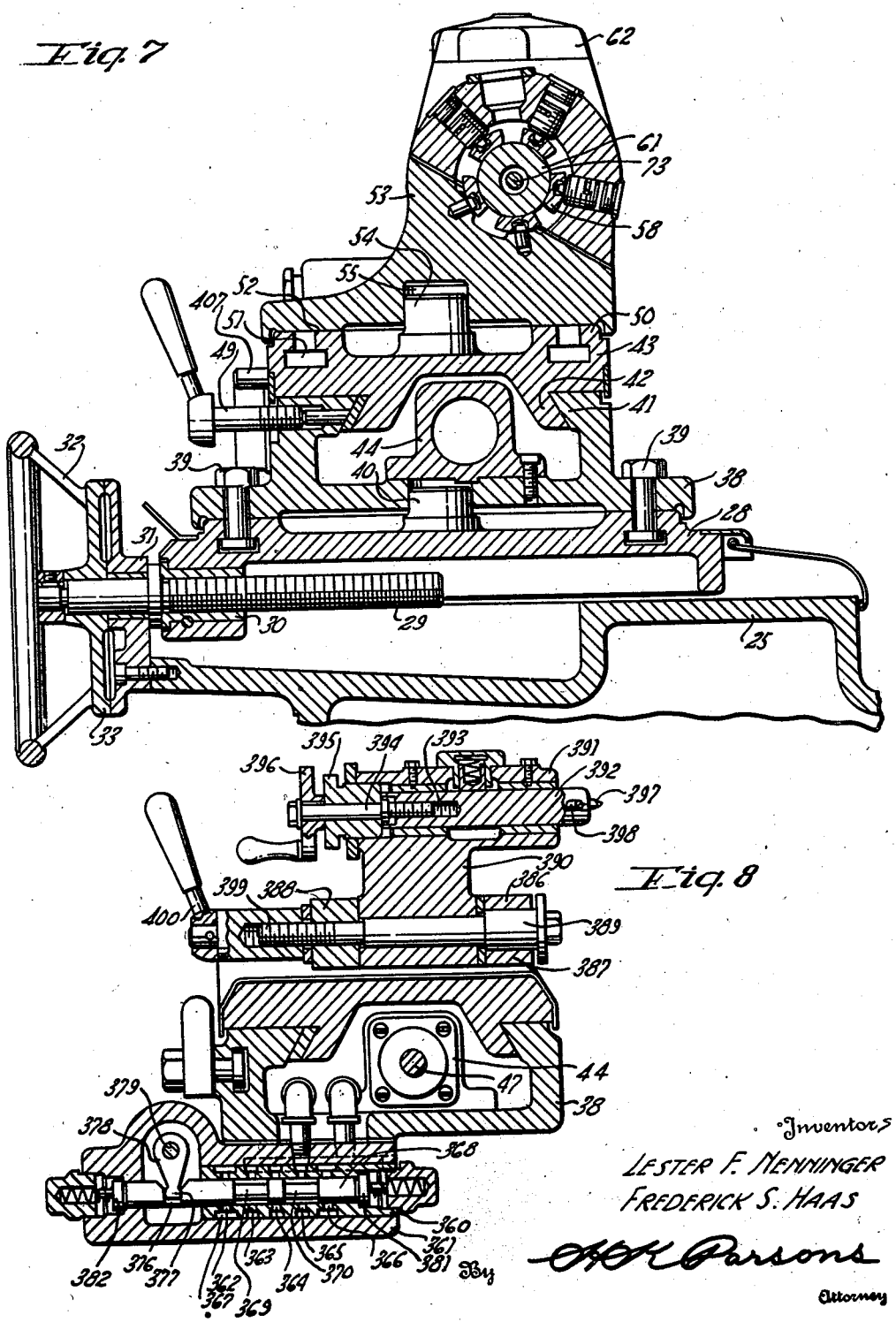

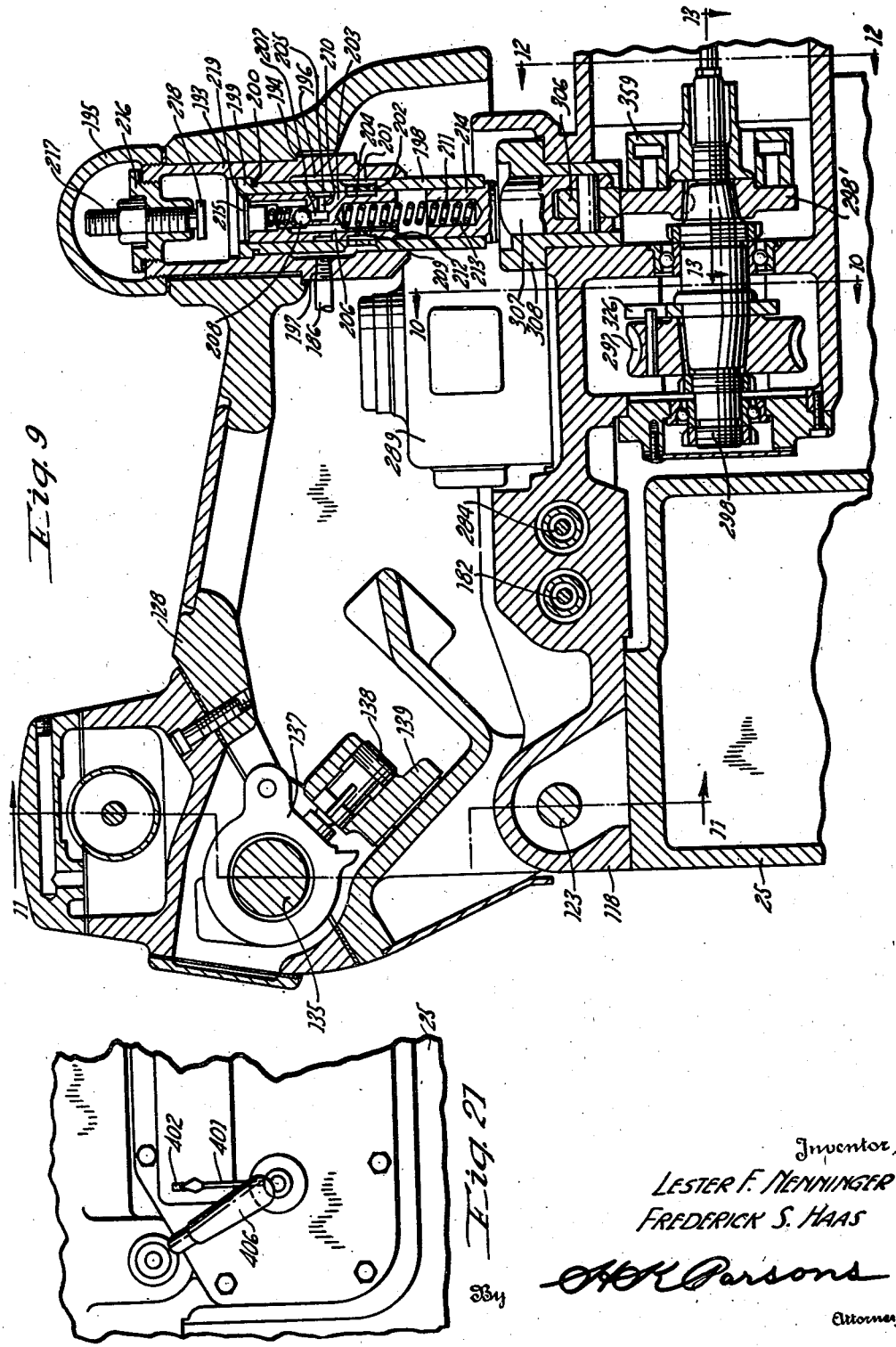

Dec. 31, 1935.   L. F. NENNINGER ET AL   2,025,885
GRINDING MACHINE
Filed July 28, 1934   9 Sheets-Sheet 7

Inventors
LESTER F. NENNINGER
FREDERICK S. HAAS
By A. H. Parsons
Attorney

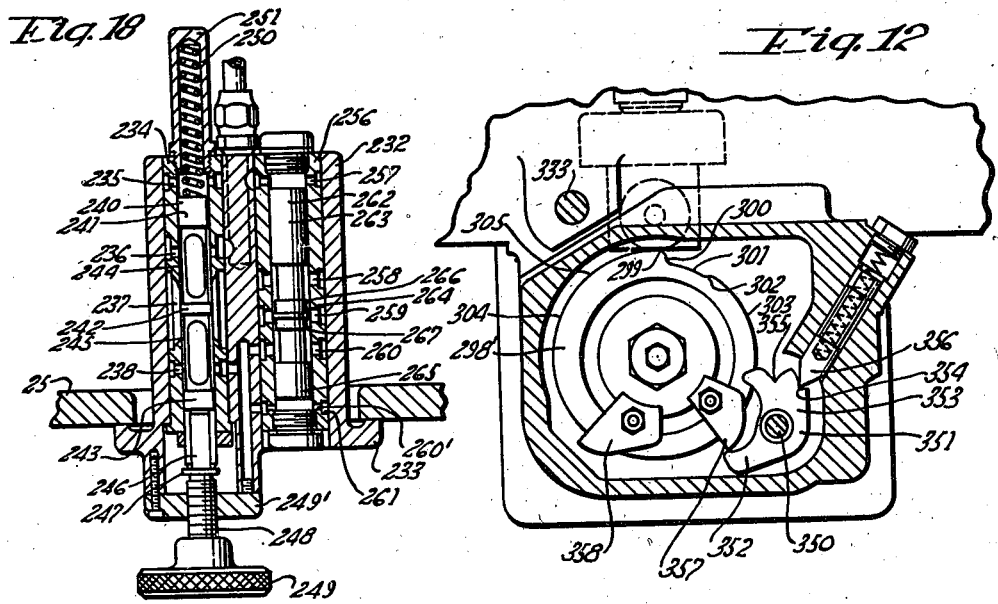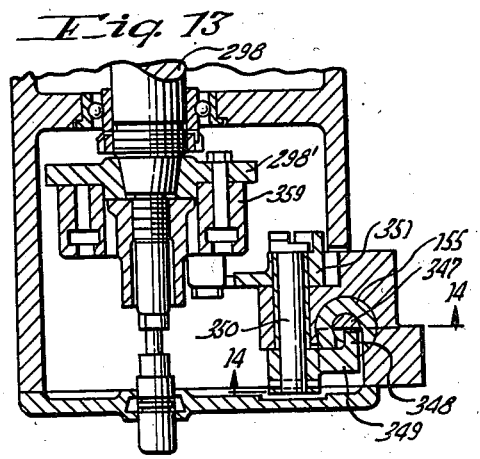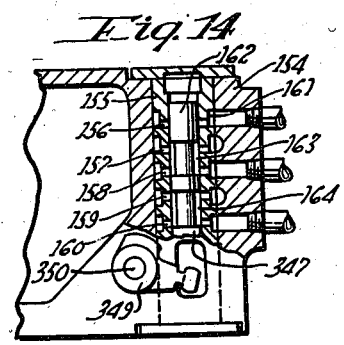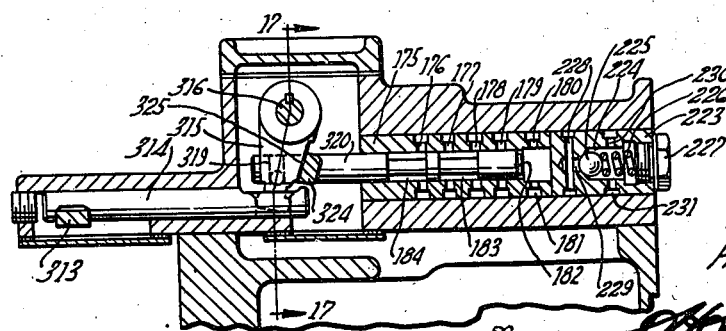

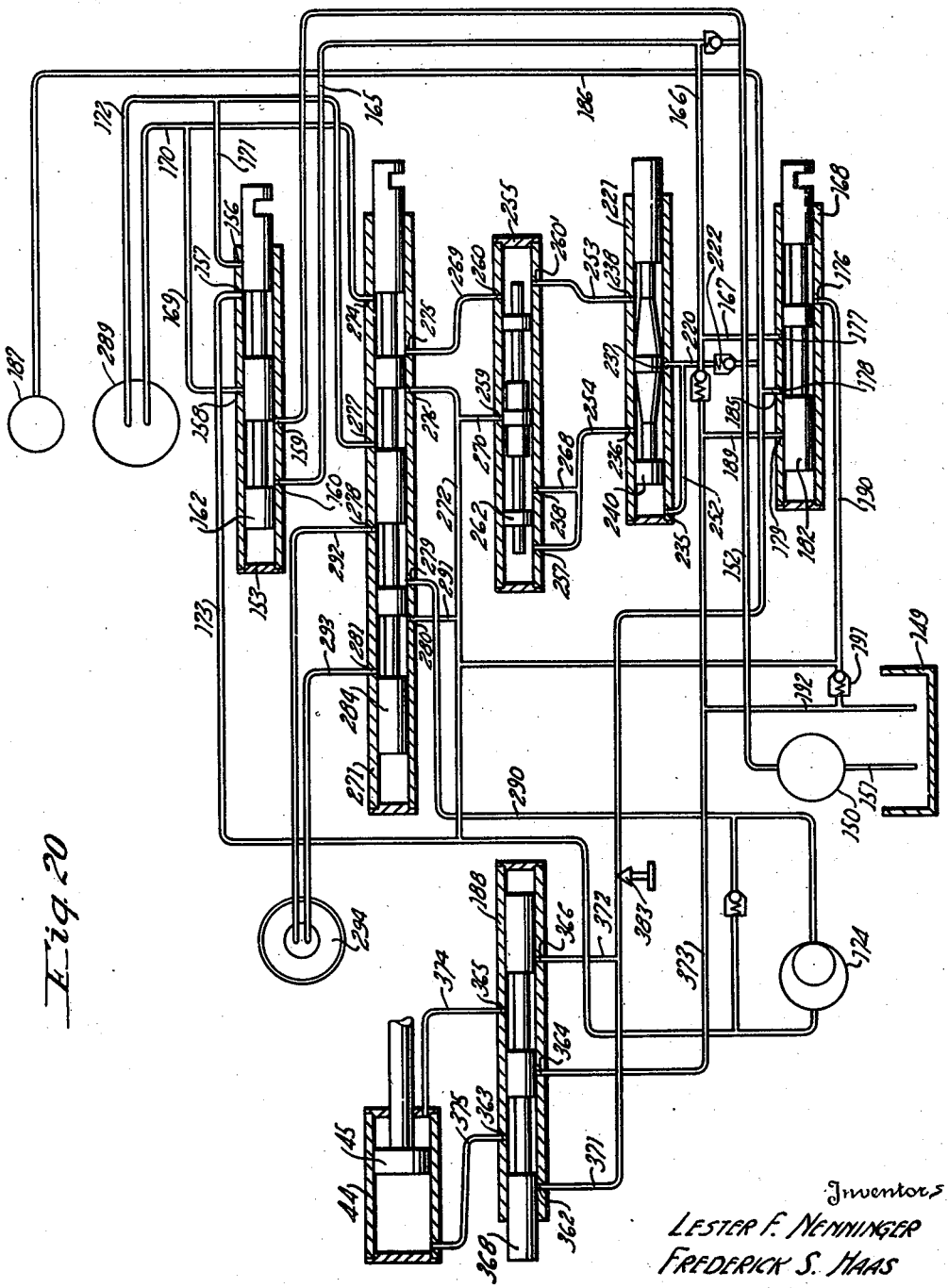

Patented Dec. 31, 1935

2,025,885

UNITED STATES PATENT OFFICE 2,025,885

GRINDING MACHINE

Lester F. Nenninger and Frederick S. Haas, Cincinnati, Ohio, assignors to Cincinnati Grinders Incorporated, Cincinnati, Ohio, a corporation of Ohio Application July 28, 1934, Serial No. 737,448

17 Claims. (Cl. 51—105)

This invention relates to improvements in metal working machines and particularly to grinding machines for the production of accurately formed work pieces such as the race way of roller bearing races and the like.

An object of the invention is therefore the provision of an improved grinding machine for the purpose above specified which will accurately and expeditiously produce said work pieces.

Another object of this invention is the provision of a machine tool structure, utilizing a plurality of fluid motors for obtaining the several rotative and otherwise movements of the parts wherein improved and simplified means are employed for effecting their operation.

A further object of the invention is the provision of an improved compact and simplified machine for producing extremely accurate work pieces, such as conical shaped articles which must be reduced to size within narrow limits of tolerance.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 3 is a top plan view of the machine shown in Figures 1 and 2.

Figure 4 is a vertical sectional view taken substantially on line 4—4 of Figure 3.

Figure 5 is a view, partly in section and partly in elevation, illustrating the means for rotating the work and its spindle as seen substantially from line 5—5 on Figure 2.

Figure 6 is a sectional view through one of the hydraulic motors, utilized in carrying forward this invention as seen from line 6—6 on Figure 5.

Figure 7 is a fragmentary vertical sectional view as seen from line 7—7 on Figure 4.

Figure 8 is a sectional view through one of the control valves and the trueing mechanism when disposed in trueing position, as seen substantially from line 8—8 on Figure 3.

Figure 9 is a longitudinal sectional view through the wheel head as seen from line 9—9 on Figure 3.

Figure 11 is a view taken at right angles to Figure 9 through the forward or spindle end thereof as seen substantially from line 11—11 on said Figure 9.

Figure 12 is a view, partly in section and partly in elevation, as seen from line 12—12 on Figure 9.

Figure 13 is a sectional view taken at right angles to Figure 12 as seen substantially from line 13—13 on Figure 9.

Figure 14 is a view, partly in section and partly in elevation, as seen from line 14—14 on Figure 13.

Figure 15 is a sectional view of the main control valve as seen from line 15—15 on Figure 3.

Figure 16 is a view through the second control valve and taken in a plane parallel with and adjacent the plane of Figure 15.

Figure 18 is a sectional view taken on line 18—18 of Figure 2.

Figure 19 is a sectional view taken on line 19—19 of Figure 17.

Figure 20 is a diagrammatic view illustrating the hydraulic circuit involved in this invention.

Figure 21 is a partial rear elevational view of the grinding wheel head.

Throughout the several views of the drawings similar reference characters are employed to denote the same or similar parts.

Figure 1:
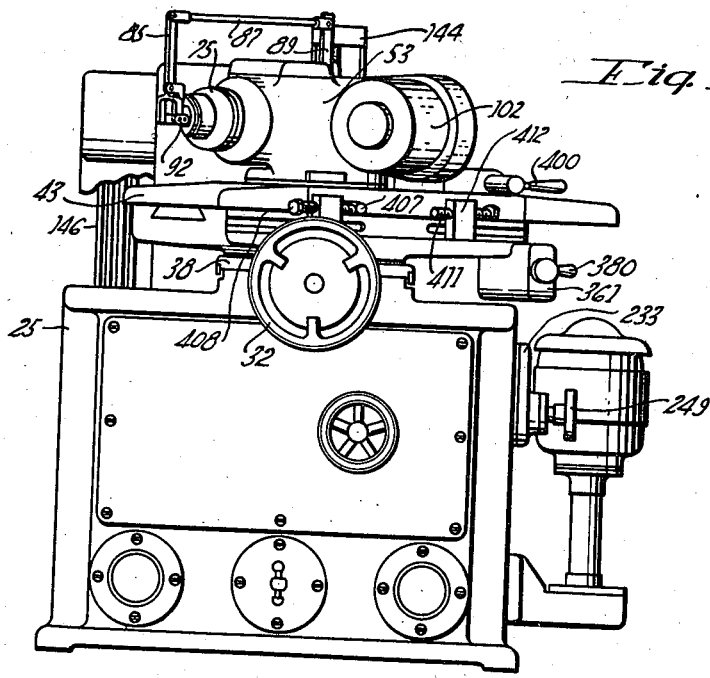
Figure 1 is a front elevational view of the grinding machine embodying improvements of this invention.

As was mentioned above, this invention pertains to an improved grinding machine for finishing contour work pieces and is especially adapted to the finishing of the exterior surfaces of cylindrical or hollow work pieces. The particular embodiment illustrated in the drawings was designed for grinding or finishing the conical race way on the inner race of anti-friction roller bearings, but it is to be understood that the machine is not exclusively limited to that type of work piece as it embodies principles and constructions having utility in other machine tool assemblies. The chief purpose of the invention, as pointed out above, is the provision of a compact precision grinding machine which is substantially fully hydraulically operated for thereby taking advantage of the inherent desirable characteristics of fluid power to produce precision work pieces.

Specifically, the machine comprises a supporting member or bed 25 on the upper forward surface of which is formed a dovetail guideway 26 receiving a correspondingly shaped guiding tongue 27 depending from a slide 28. The guide way 26 is adapted to guide the slide 28 for in and out movement relative to the bed and this movement is effected by a screw 29 having a threaded engagement with a nut 30 integral with or secured to the lower surface of the slide. In order to rotate the screw it is rotatably mounted in a plate or bracket 31 secured to the forward edge of the bed as seen in Figure 7. The screw projects beyond the bracket or plate 31 to receive a hand wheel 32, which has integral therewith a flange 33 carrying graduations which cooperate with a pointer or the like on the plate or bracket 31 to indicate the amount of rotation given to the screw 29. The slide 28 is adapted to be locked in its different positions of adjustment by a clamping mechanism shown at 34 in Figure 4.

The upper surface of the slide 28 is provided with a circular guide 35 in which is formed a T slot 36. The guide 35 has mounted thereon a guide way 37 formed on the under surface of a base plate 38. In order to hold the base plate to the slide 28 the said base plate is provided with apertures through which clamping bolts 39 extend from the T slot 36, see Figure 7. Projecting upwardly from the slide 38 is a trunnion 40 received in a suitable aperture formed in the bottom of the base plate 38. The axis of the trunnion 40 is co-incidental with the axis of the lower slide guide 35 and base plate guide way 37 from which it will be noted that the base plate may be swiveled relative to the slide 28 and clamped in adjusted positions by the bolts 39.

The base plate 38 is provided in its upper surface, see Figure 7, with a dovetail guide way 41 receiving the correspondingly shaped guide 42 depending from a second or upper slide 43. The upper slide 43 is adapted to be translated relative to the base 38 by hydraulic means, for which purpose the base plate 38 has bolted or otherwise secured thereto a cylinder 44 enclosing a piston 45, see Figure 4. The cylinder 44 is closed at opposite ends by cylinder heads 46, one of which is provided with a stuffing box through which projects a piston rod 47 and has secured to the inner end thereof piston 45. The outer end of piston rod 47 is secured in an aperture formed in a bracket 48 integral with or secured to the upper slide 43 and depending therefrom. The hydraulic means for actuating the piston 45 is illustrated in Figure 20 and will be described in detail later. The slide 43 is adapted to be located in different operative positions by means of a clamping mechanism 49 shown in Figure 7.

The upper slide 43 is provided substantially midway of its length with a circular guide 50 in which is formed a T slot 51. Mounted on the circular guide 50 is a correspondingly shaped guide way 52 formed on the under surface of a work head 53. Projecting upwardly from the upper slide 43 at the axis of the guide 50 is a trunnion 54 received in an aperture 55 formed in the under surface of the work head 53. From the foregoing it will be noted that the work head 53 may be oscillated relative to the upper slide 43 and is adapted to be clamped or secured in angular positions by suitable clamp bolts extending from the T slot 51 through the work head 53.

The work head 53, as shown in Figure 4, is provided at opposite ends thereof with bearing apertures 56 and 57 in axial alignment with one another, in each of which is disposed a plurality of bearing shoes 58 encircling journal portions 59 and 60 of a spindle 61. The head 53 has secured thereto a cover plate 62 through which is formed a plurality of ports 63 which terminate at their inner ends in the bearing openings 56 and 57 and are adapted to supply lubricant to the bearing shoes 58 and the said ports have their outer end connected with a suitable lubricant supply, not shown. Additionally, the head cap 62 is provided with an anchor 64 for a thrust bearing 65 located centrally of the spindle for taking the thrust thereon as developed during the grinding.

One end of the spindle 61 is provided with a tapered nose 65 to which is secured a pulley or sheave 66, here shown as of the multiple groove type. Bolted or otherwise secured to the forward face of the pulley or sheave 66 is a chuck body 67 in which are slidably mounted plungers 68. The forward ends of the plungers 68 have secured thereto fingers 69 adapted to enter the bore in work pieces 70. The inner ends of the plungers 68 are provided with notches 71 receiving a circular head 72 on one end of a rod 73. The rod 73 is disposed in a bore formed axially through the spindle 61 and projects beyond the rear end of the spindle.

The projecting rear end of the rod 73 has secured to it a piston 74 enclosed within a cylinder 75 secured to a plate 76, in turn secured to the rear end of the spindle 61. Projecting from the rear end of the cylinder 75 is a rod or bar 77 having formed therein ports 78 and 79 respectively communicating on their inner ends with the cylinder on opposite sides of the piston 74, the former effecting this communication directly, while the latter is connected through suitable ports 80 formed in the wall of the cylinder 75. Mounted on the rod or bar 77 is a bushing or sleeve 81 having formed therethrough ports in communication with the ports 78 and 79 of the bar 77. Disposed on the exterior of the bushing or sleeve 81 is a casing 82, likewise having formed therein ports, one of which is connected with a source of fluid pressure, preferably air, the other being exposed to the atmosphere at all times.

Figure 2:
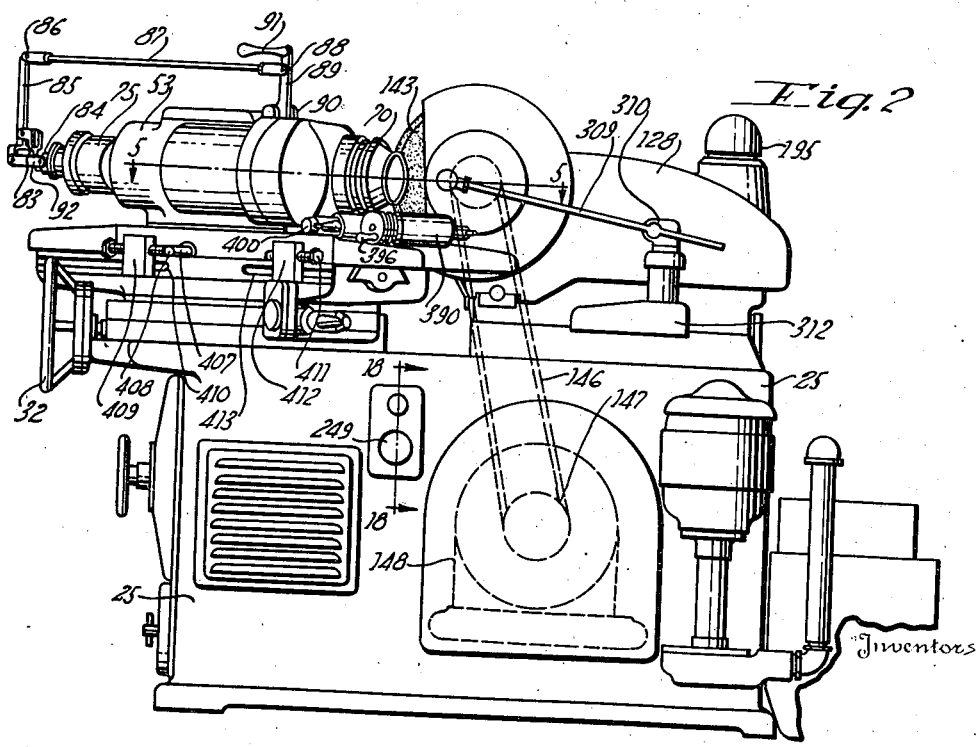
Figure 2 is a side elevational view of the machine shown in Figure 1 as seen particularly from the right hand side of Figure 1.

The casing 82 is slideable on the sleeve 81 for alternately connecting the pressure with one of the ports in the sleeve 81 and thereby one of the ports 78 and 79 in the rod or bar 77 and the other ports with the atmosphere. From this it will be seen that the piston 74 is alternately axially shifted relative to the cylinder 75 for shifting the rod 73 relative to the spindle 61 and effecting thereby the clamping and unclamping of the work 70 on chuck fingers 69. The means for effecting the movement of the casing 82 is shown in Figures 1 and 2 and comprises a yoke member 83 projecting rearwardly from a collar 84 loosely mounted on the sleeve 81 whereby the said collar remains stationary during the rotation of the spindle and parts associated therewith, including the bushing or sleeve 81. Pivotally mounted on the outer end of the yoke 83 is a lever 85 having its upper end pivoted at 86 to one end of a rod 87. The other end of rod 87 is pivoted at 88 to an arm 89 which is in turn pivoted at 90 to a portion of the work head 53. The arm 89 has secured to one end a handle 91 whereby the said arm is actuated about its pivotal connection 90. The lever 85 has pivoted to it intermediate its ends an actuator 92 whereby oscillation of the lever 85 carries with it the actuator 92 for shifting the casing 82 and thereby changing the porting to the cylinder 75.

It is believed that the operation of the chuck actuating mechanism is self-evident since a movement of the arm 89 about its pivot 90 will effect a corresponding movement of the lever 85 and the actuator 92, thereby shifting the casing 82 to the left as seen in Figure 4. Accordingly a reverse movement of the arm 89 or forwardly about the pivot 90 will correspondingly shift the lever 85 and casing 82. Since one of the ports in the said casing 82 is at all times connected with a source of fluid pressure, this pressure will be alternately directed through the sleeve or bushing 81 to the ports 78 and 79 for thereby alternately shifting the piston 74 relative to the cylinder 75 and correspondingly actuating the work chuck.

The work spindle and chuck is rotated by the rotary hydraulic motor which is shown in Figures 5 and 6. As there shown the work chuck pulley or sheave 66 has trained thereabout a pair of V belts 93, being in turn trained about a second sheave or pulley 97 keyed or otherwise secured to a short shaft 98 rotatably journaled in a suitable bore formed in a bracket 99. The bracket 99 is in turn bolted or otherwise secured to a plate 100, see Figure 3, extending outwardly from the head 53. The plate 100 has additionally bolted or otherwise secured thereto a guard 101 which encloses the transmission belts 96.

The bracket 99 forms a support for the rotary hydraulic motor by having bolted or otherwise secured thereto the motor casing 102. Since the motor per se forms no part of the present invention it will not be described in detail, but only sufficient description thereof to indicate its mode of operation.

The motor casing 102 therefore has formed therein a central aperture in which is disposed the rotatable motor shaft 103 which has formed substantially midway of its length a three-lobed cam section 104. Extending radially of the central opening, the casing 102 is provided with piston bores, each having disposed therein a piston 105, 106, 107 and 108 adapted to be axially shifted through their respective cylinders. Each of the said pistons is provided at opposite ends with a slot 109 and 110 extending laterally thereof or in a construction parallel with the axis of the shaft 103. Extending into the several piston plunger cylinders is a pin 111 received in the upper piston plunger slots 109 for preventing any rotary movement of said piston plungers during operation, while the lower slots receive therein the axle of a roller 112 which rides on the cam portion 104 of the motor shaft 103.

The motor casing 102 is provided therein with suitable ports, such as 113, which terminate on their outer end with the outer ends of the piston plunger cylinders. The inner ends of said ports 113 communicate alternately with the central pressure port 114 formed in the motor shaft 103. The port 114 at its inner end communicates by way of a radial port 115 with the source of hydraulic pressure as illustrated in Figure 20 and will later be described in detail. The ports 113, and therefore the piston cylinders, connect alternately with one of a plurality of discharge ports 116 formed in the motor shaft 103 parallel with the central pressure port 114. The inner ends of these ports 116 connect through radial ports 117 with the discharge or return line of the hydraulic system as shown in Figure 20, and as will be later described in detail.

From the foregoing it will now be seen that the work pieces are rotated by hydraulic means and that the axis of the work may be disposed in angular relation to the bed of the machine. It will also be noted that the said work may be actuated longitudinally of the bed as by the piston 45, and laterally thereof through the adjusting screw 29.

The bed 25 behind the work supporting and rotating mechanism just described has secured thereto a bed plate 118, see Figure 9, in the forward end of which are provided bores 119 and 120 in axial alignment for respectively receiving anti-friction bearings 121 and 122. Journaled in said bearings is a trunnion shaft 123 having its opposite ends projecting beyond the bed plate as at 124 and 125, the said projecting ends being respectively received in suitable bores formed in flanges 126 and 127, depending from a wheel head or carriage 128, see Figure 11. The carriage 128 is surmounted by a cap 129 and formed in the head and cap are bearing bores 130 and 131. The bores 130 and 131 each have mounted therein a plurality of bearing shoes 132 on which is journaled the journals 133 and 134 of the grinding wheel spindle 135. This construction is similar to the construction above illustrated in connection with the work supporting and rotating spindle 61 and since neither per se form a part of this invention they are not further described in detail.

The bearing cap 129 has secured to its upper end a cover plate 136 in which is provided, though not particularly shown, ports similar to those formed in the work head which connect at one end to a source of lubricant and at the other end with ports in the bearing cap 129 and eventually the bearing bores 130 and 131. Centrally of the spindle 135 it is provided with a thrust bearing assembly 137 which is similar to the thrust bearing 65 of the work spindle but instead of being anchored to the cover plate it is anchored at 138, as seen in Figure 9, to a bracket 139, in turn secured to the carriage 128 interiorly thereof.

The spindle 135 is provided at opposite ends with a tapered nose 140 and 141. Secured to the tapered nose 140 is a wheel collet 142 to which is securely clamped a grinding wheel 143.

The wheel 143 is enclosed by a suitable wheel guard 144 secured to the carriage 128 and utilized for confining the coolant usually employed with grinding wheels. The other tapered nose 141 of the spindle 135 has keyed and otherwise secured thereto a pulley or sheave 145, here shown as of the multiple V groove type. Trained about the pulley or sheave 145 is a plurality of V belts 146 extending in turn about a driving sheave 147 secured to the motor shaft of electric motor or prime mover 148 located within the bed 25, as seen in Figure 2.

To effect a stock removal from the work piece the wheel head unit is oscillated about the axis of the trunnion or pivot shaft 123. This oscillation is effected by hydraulic means and it is believed the description of the operation and the control means therefor will be more clear if based on the hydraulic circuit shown in Figure 20. Accordingly, the circuit will be described in detail and the various control valves and units hydraulically actuated will be described in detail with reference to their structural views as they are encountered in the circuit.

By reference to Figure 20 it will be noted that there is provided a tank or sump 149 containing hydraulic medium, preferably oil, which is to be circulated through the system, this tank being preferably formed interiorly of the machine bed 25. Located above the tank 149 is a constant delivery pump 150 having extending from one side thereof a pipe 151 terminating in the sump or tank 149. Extending from the other side of the pump 150 is a pressure pipe or conduit 152 which terminates in a valve mechanism indicated generally by the reference character 153.

The valve mechanism 153 may be termed the cycle control valve as it is operated to change the oscillatory movement from a slow infeed to a rapid return and vice versa, depending upon the particular condition of the piece of work being operated upon, that is, if a series of work pieces each have more stock than a second series of work pieces the cycle may be varied or changed to vary the time interval in which the actual grinding takes place. This valve mechanism is shown structurally in Figure 14, and as there shown, comprises a valve block 154 integral with or secured to the bed plate 118. The valve block 154 has formed therethrough a bore into which is pressed a valve bushing 155, having formed therethrough a plurality of sets of radial ports 156, 157, 158, 159 and 160, each set of ports being encircled by a similar circumferential groove 161 formed in the exterior of the bushing 155. Disposed within the bore in the bushing 155 is a valve member 162 having provided thereon piston portions between which are formed reduced portions or cannelures 163 and 164 adapted to connect the radial ports in different combinations, depending upon the position of the valve member 162. The means for actuating the valve member 162 to its different operative positions is shown in Figures 14, 13 and 12 and will be described in detail later.

As seen in Figure 20 the bushing ports 159 have connected therewith the pipe or conduit 152 while the ports 160 have connected one terminus of a pipe or conduit 165 which terminates at its other end with a pipe or conduit 166, in turn connected with pipe or conduit 167 which is connected with a valve mechanism indicated generally in Figure 20 by the reference character 168. The ports 158 of the valve bushing 155 have connected therewith one end of pipe or conduit 169 which terminate in a pipe or conduit 170, while ports 156 are connected therewith one end of a pipe or conduit 171, terminating at its other end in the pipe or conduit 172. The remaining ports 157 of the bushing 155 have connected therewith one end of a pipe or conduit 173 which terminates at its other end in a relatively closed hydraulic circuit including the variable displacement or delivery pump 174.

The valve mechanism 168 is shown structurally in Figure 15, and as there shown, comprises a valve bushing 175 pressed into a suitable bore formed in the bed plate 118. The valve bushing 175 has formed therethrough a plurality of sets of radial ports 176, 177, 178, 179 and 180, each set of ports being encircled by a similar circumferential groove 181 formed in the exterior of the valve bushing 175. Disposed within the bore in the bushing 175 is a valve member 182 having provided thereon a plurality of piston portions for forming therebetween reduced portions or cannelures 183 and 184 which are utilized for connecting the sets of radial ports in different combinations depending upon the position of the valve member 182. The means for shifting the valve member will be described in detail later.

As seen in Figure 20, it is the ports 177 of the bushing 175 that the conduits 167 connects, while the ports 178 have connected therewith one end of a pipe or conduit 185 which empties into a pipe or conduit 186, terminating at one end in a hydraulic jack indicated in general in Figure 20, by the reference numeral 187. The other end of the pipe or conduit 186 terminates in a valve mechanism indicated generally in Figure 20 by the reference numeral 188 which controls the operation of the slide hydraulic motor or piston 45 which will be described in detail later. The ports 179 of the valve bushing 175 have connected therewith one terminus of a pipe or conduit 189 which empties into the pipe or conduit 166, while the remaining bushing ports 176 have connected therewith one end of a pipe or conduit 190 terminating at its other end in a low pressure relief valve 191, in turn emptying into a pipe or conduit 192 and the sump or tank 149.

The hydraulic jack 187 is utilized for effecting the rapid oscillation of the grinding wheel carriage about its trunnion 123 and this mechanism is shown structurally in Figure 9. As there shown, the hydraulic jack comprises a sleeve 193 having a shoulder 194 formed thereon for engaging a cooperating shoulder on the carriage 128. The upper end of the sleeve 193 is threaded to receive cap nut 195 which engages the carriage and clamps the sleeve 193 between itself and the shoulder 194, thereby making sleeve 193 in effect a part of the carriage 128. The sleeve 193 is provided interiorly with an undercut or relieved portion 196 communicating through the port 197 formed through the sleeve with the pipe or conduit 186. Disposed in the bore in the sleeve 193 is a hollow plunger 198 having at one end a flange or collet portion 199 adapted to engage a shoulder 200 within the sleeve 193 and which, as will later be made clear, limits the upward movement of the jack. The plunger 198 is provided intermediate its ends with a circumferential groove 201 adapted to be at all times in register with the internal groove 196 in the sleeve 193. Extending through the wall of the plunger 198 at the circumferential groove 201 is a plurality of radial ports 202 whereby communication between the pipe or conduit 186 and the interior of the hollow plunger 198 is had. Disposed within the bore in the plunger 198 is a valve member 203 having formed therein a pair of circumferential grooves 204 and 205. Formed within the valve member 203 is a port 206 extending vertically therethrough parallel with the axis thereof. Additionally, the valve member is provided with a second vertical port 207 provided at its upper end with a valve seat for the spring pressed check valve 208. The vertical port 206 communicates with the valve circumferential groove 204 by means of a port 209, while the vertical port 207 communicates with the circumferential groove 205 through a port 210.

The plunger 198, while itself movable to effect the oscillation of the carriage 128 as will later be described, is, so far as the operation of the jack is concerned, relatively stationary and is adapted to have the sleeve 193 movable relative thereto on its exterior surface. Additionally, the valve member 203 is movable relative to the interior of the bore of the plunger 198. The valve member is normally held in and shifted to the position shown in Figure 9 by a spring 211 which is seated at its upper end in a socket 212 formed in the bottom of the valve member, and seated at its other end in a socket 213 formed in an abutment piece 214 secured to the lower end of the plunger 198. The upward movement of the valve member 203, as effected by the spring 211, is limited by a spring ring 215 let into the upper end of the plunger 198.

During the movement of the carriage 128 and particularly when near its fully retracted position the said carriage effects the operation of the valve member 203 against the yielding resistance of the spring 211. The means for effecting this operation comprises a plug 216 threaded into the upper end of the sleeve 193 through which projects a bolt 217 having formed on its lower end an abutment 218, which during the descent of the carriage 128 shifts the valve member 203.

The operation of the hydraulic jack is as follows: Hydraulic medium under pressure flowing through the pipe or conduit 186 passes through the port 197 to the circumferential groove 196 from which it enters the circumferential groove 201 formed on the exterior of the plunger 193. At this time, however, the valve member 203 is at its lower position with the groove 205 thereof in register with the ports 202 from the plunger groove 201. The hydraulic medium flows through the ports 204 and 205 for unseating the check valve 208 which affords communication with the port 206 or its continuation 219, shown in Figure 9, as formed to the right of the check valve 208 while the port 206 is formed to the left. The hydraulic medium on passing out of the port 206 or its extension 219 acts on the plunger head 218 to effect an upward movement thereof and therefore an oscillation of the carriage 128 about the axis of the trunnion 123. The carriage on moving upwardly permits the spring 211 to expand for correspondingly shifting the valve member 203 until it reaches the position shown in the drawings, at which time the second circumferential groove 204 of the valve member is in communication with the ports 201 and therefore the conduit 186, whereupon the medium passes directly into the vertical port 206 above the check valve 208 and the extension port 219 for continuing the oscillation of the carriage 128. It should be noted that there are two sets of ports 202 connecting the internal circumferential groove 201 of the valve member and it should be noted also that the two external grooves 205 and 204 in the valve member bear an overlapping relation so that before one is completely out of communication with said ports the other is partially in communication therewith, thereby permitting a substantially continuous flow of the hydraulic medium to the abutment 218 and plug 216 for continuing the oscillation of the carriage 128 once the said oscillation is initiated.

The oscillation of the carriage 128 by the hydraulic jack, as just described, is effected at a relatively rapid rate and is employed for bringing the grinding wheel and work into operative relation and this rapid movement is followed by a relatively slow feeding movement by means to be later described.

Reverting now to the hydraulic diagram and continuing the description therefrom it will be noted that the pipe or conduit 186 has extending therefrom a pipe or conduit 220 which terminates in a throttle or rate control valve mechanism indicated in general in Figure 20 by the reference numeral 221. Contained in the pipe or conduit 220 is a high pressure relief valve indicated in general in Figure 20 by the reference numeral 222 which is blown or opened after the hydraulic jack has been actuated to the limit of its movement and the pressure has been raised to the point for effecting its operation. This valve mechanism 222 is shown structurally in Figure 15 and comprises a small housing 223 pressed into the same bore in the bed plate 118 that contains the valve bushing 175. The housing 223 is provided therein with a counterbore 224 at the base of which is formed a valve seat for the ball valve member 225. The ball valve 225 is held to its seat by a spring 226 which abuts on one end with the said ball valve and on the other end with a plug 227 which closes the counterbore 224. The housing 223 is provided therethrough with a radial port 228 which communicates by way of the axial port 229 with the counterbore 224. The housing 223 is further provided with a set of radial ports 230 extending from the counterbore 224 and said ports are encircled by a circumferential groove 231 formed in the exterior of the housing 223.

The housing ports 228 have connected therewith the terminus of the pipe or conduit 220 extending from the pipe or conduit 186 while the ports 230 have connected therewith the continuing portion of the pipe or conduit 220 or that portion between the relief valve mechanism 222 and the throttle valve mechanism 221.

The throttle valve mechanism 221 is shown structurally in Figure 18 and comprises a housing 232 which is let through a suitable opening in the bed 25 and secured thereto by bolts and the like passing through a flange 233 integral with the housing 232. The housing 232 is provided with a bore into which is pressed a valve bushing 234 which has formed therethrough a plurality of sets of radial ports 235, 236, 237 and 238, each set being encircled by a circumferential groove formed in the exterior of the bushing 234. Disposed within the bore in the bushing 234 is the throttle valve member 240 having formed thereon piston portions 241, 242 and 243 which closely engage the wall of the bore through the bushing. Connecting the piston portions 241 and 242 is a reduced portion 244 of a diameter slightly less than the diameter of the piston portions, while connecting the piston portions 242 and 243 is a similar reduced portion 245, also of a diameter slightly less than the diameter or the piston portion. The reduced portion 244 cooperates with the ports 236 and a portion of the ports 237 for forming a hydraulic resistance while the reduced portion 245 likewise cooperates with the ports 238 and a portion of the ports 237 for likewise forming a restricted orifice therefor. It will be noted that the ports 237 are relatively long and are in effect narrow slits and that the central piston portion 242 is comparatively narrow; therefore a portion of the ports or slits 237 is disposed on each side of the said central piston portion 242. The valve member 240 is adjustable relative to the bushing to control the position of the piston portion 242 with respect to the ports 237. This adjustment is made to determine the amount of fluid to be utilized in the operation of the machine and therefore the speed at which it will be operated and the amount of fluid which is by-passed or returned to the sump.

In order to adjust the position of the valve member 240 it has projecting therefrom a stem 246 which abuts a head 247 on the inner end of an adjusting screw 248. The screw 248 is threaded through a cap plate 249' secured to the housing 232 for closing the bore in which is pressed the valve bushing 234 and the said screw 248 has secured thereto a suitable actuating knob 249. The valve member 240 is held in operative position as determined by the screw 248 by a spring 250 abutting on its inner end with the adjacent end of the valve member 240 and on its outer end with the base of a spring sleeve 251.

Referring to Figure 20 it will be seen that it is with the ports 237 that the pipe or conduit 220 connects, while the ports 235 have connected therewith one terminus of a pipe or conduit 252 which extends from the pipe or conduit 220. The ports 236 and 238 have respectively connected therewith one terminus of pipes or conduits 253 and 254 which terminate in a balanced valve mechanism indicated generally in Figure 20 by the reference numeral 255. This balanced valve mechanism 255 is utilized for maintaining constant flow as established by the setting of the throttle valve mechanism 221 and is shown structurally in Figure 18. As there shown, the housing 233 has formed therein a second bore into which is pressed a valve bushing 256 through which is formed a plurality of radial ports 257, 258, 259, 260 and 260', each set of ports being encircled by a similar circumferential groove 261 formed in the exterior of the bushing 256. Disposed in the bore in the bushing 256 is a valve member 262 having formed thereon piston portions 263, 264 and 265 from which extend reduced portions for connecting one another. The central piston portion 264 is relatively narrow in length and cooperates with the ports 259 and is of considerably less width than the lateral dimension of said ports. Projecting from opposite sides of the piston portion 264 is a collar 266 and 267 of a diameter slightly less than the diameter of the piston portion 264. These reduced collar portions 266 and 267 form resistances to the flow of the hydraulic medium between the ports as will shortly be described in detail.

As seen in Figure 20 it is with the ports 257 of the bushing 256 that the pipe or conduit 254 connects, while the ports 260' have connected therewith the other terminus of the pipe or conduit 253. The ports 258 have connected therewith one terminus of a pipe or conduit 268 which extends from the pipe or conduit 254. The remaining ports 259 and 260 have respectively connected therewith one end of a pipe or conduit 270 and 269, the latter emptying into the main control valve indicated in general in Figure 20 by the reference character 271, while the former empties into a pipe or conduit 272 likewise emptying into the main control valve mechanism 271.

The throttle valve mechanism is initially set to determine the amount of fluid to flow on either side of the central portion or piston 242 of the valve member 240, which therefore determines the amount of flow in the pipes or conduits 253 and 254. As will be noted, this flow is to the ends of the balanced valve member 263, positioning the said member with respect to the ports 259. Simultaneously, there is a flow through the pipe 268 to the valve mechanism and a flow from the balanced valve mechanism 255 through the pipes or conduits 269 and 270, the former emptying into the valve mechanism 271, while the latter empties into return conduit 272. In the event a greater flow should occur due to some cause this greater flow would build up a pressure on the right hand end of the balanced valve member and shift same to the left, thereby cutting off the flow through the pipe or conduit 270 and checking this excessive flow. Conversely, should the flow decrease for any reason, the pressure at the left hand end of the valve would be lower while the pressure at the right hand end would remain the same, and therefore the higher would shift the valve member to the left and increase the flow. Under either of these conditions the unusual circumstances causing the variation in flow would soon be rectified and the balanced valve member returned to its normal operative position.

The control valve mechanism 271 is shown structurally in Figure 16 and comprises a valve bushing 273 having formed therethrough a plurality of sets of radial ports 274, 275, 276, 277, 278, 279, 280, 281 and 282, each set being encircled by a similar circumferential groove 283 formed in the exterior of the bushing 273. Disposed within the bore in the bushing 273 for sliding movement relative thereto is a valve member 284 having formed thereon a plurality of piston portions between which is formed reduced portions or cannelures 285, 286, 287 and 288, adapted to connect the sets of radial ports in different combinations, depending upon the position of the valve relative thereto. The means for shifting the valve member 284 is illustrated in several of the views and will be described in detail later.

As seen from Figure 20, the ports 275 and 276 have respectively connected thereto the terminus of the pipes or conduits 269 and 272 respectively extending from the balanced valve 255, the former being connected directly, while the latter is connected through the branch pipe or conduit 270. The ports 274 and 277 have respectively connected therewith one terminus of the pipes or conduits 170 and 172 above referred to, which pipes terminate at their other ends in a rotary hydraulic motor indicated in general in Figure 20 by the reference character 289. The ports 279 and 280 have respectively connected therewith one terminus of pipes or conduits 290 and 291, the former terminating at its other end in the discharge side of the variable delivery pump 174, while the latter empties into the return pipe or conduit 272. Ports 278 and 281 have respectively connected therewith one terminus of pipe or conduit 292 and 293 which terminate at their other end in the work rotation hydraulic motor, indicated in general in Figure 20 by the reference character 294 and being the same motor illustrated in Figures 5 and 6 and described above.

From the foregoing it will now be seen that the carriage 128 is first oscillated at a rapid rate and then the hydraulic rotary motor 289 is actuated to rotate means which further oscillates the carriage, this at a relatively slow feeding rate. The construction of the motor 289 is substantially identical with the construction of the motor 294 and since neither of these motors per se form a part of the present invention they are not further illustrated or described. The motor 289, however, instead of driving a sheave or pulley has connected therewith for rotation thereby a worm 295 which is secured to or integral with a shaft similar to the shaft 98 driven by the motor 294.

Figure 10:
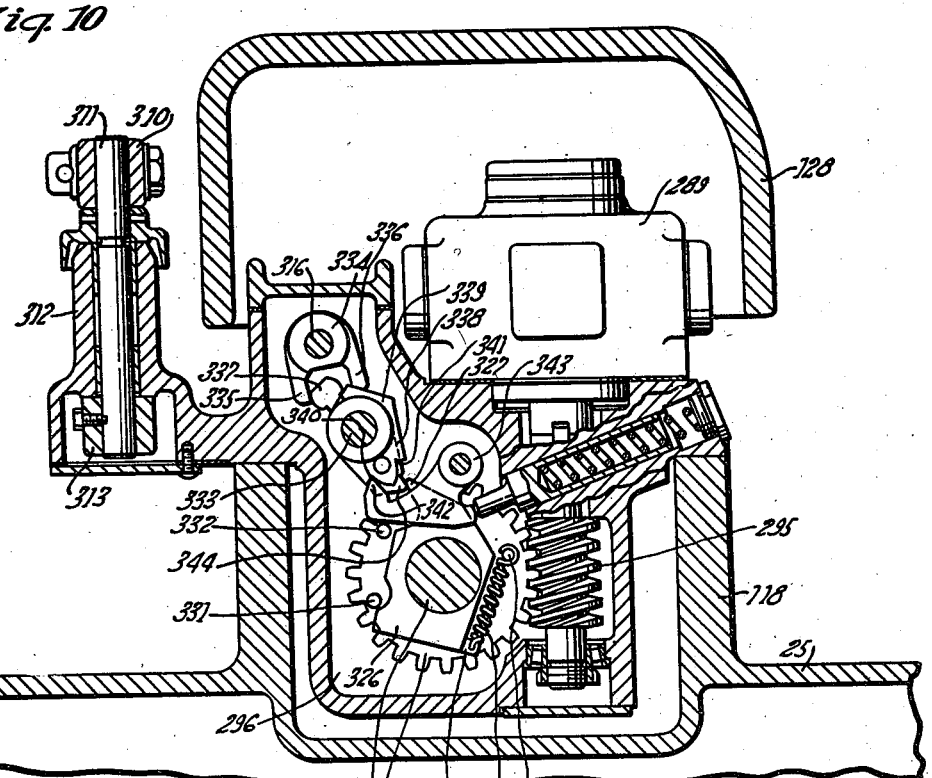
Figure 10 is a sectional view taken at right angles to that shown in Figure 9 as seen, for example, from line 10—10 on Figure 9.

The worm 295 is rotatably journaled in suitable bearings provided by the bed plate 118 which is formed with an internal pocket or cavity 296 containing the feeding mechanism and providing a support for the rotary motor 289, all as shown in Figure 10. The worm 295 meshes with the teeth of a worm wheel 297 secured to a shaft 298 rotatably journaled in bearings provided by the base 118 as seen in Figure 9. Keyed or otherwise secured to the shaft 298 is a cam 298' shown in elevation in Figure 12 and in cross section in Figure 9. The periphery of the cam 298' has a high point 299 from which there is a relatively rapid declining portion 300, terminating in a low concentric portion 301. Following the low portion 301 is a rising portion 302 terminating in a continuous slow rising portion 303 which stops at substantially the point 304. From the point 304 to the point 299 the periphery 305 of the cam is concentric. From this it will be seen that the cam 298 will effect a rapid retraction of the grinding carriage 128 through the cam portion 300 and will retain the carriage in a retracted position by the portion 301. Rotation of the cam will then through portion 302 relatively rapidly advance the carriage to a point where the cam portion 303 takes hold, at which time the carriage will be slowly oscillated to effect a stock removal from the work. When the cam reaches the point 304 the portion 305 will hold the carriage in the grinding position to permit a sparking out between the wheel and the work.

This movement of the carriage, as effected by the cam 298, is transmitted through a roller 306 rotatably carried by a plug 307 slidably mounted in a bushing 308 pressed into a bore in the bed plate 118.

Figure 17:
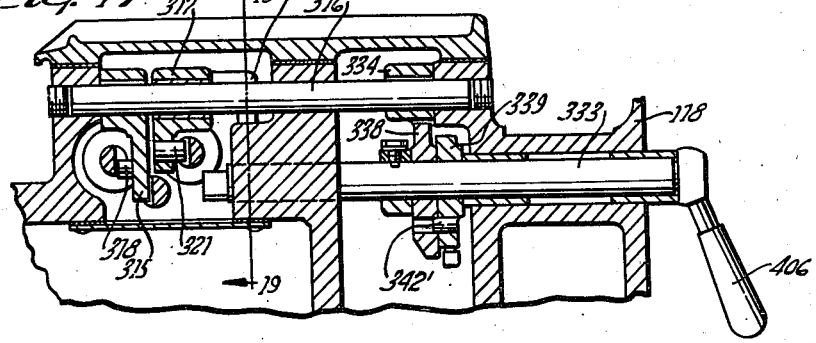
Figure 17 is a view taken at right angles to Figure 15 as seen substantially from line 17—17 of Figure 15.
Figure 79:
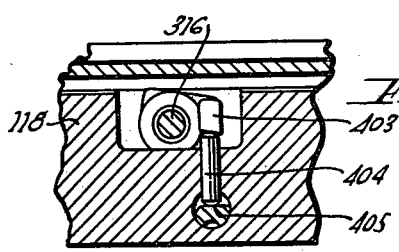

The normal cycle of the machine is effected during one complete revolution of the cam 298' starting with the cam follower roller 306 disposed on the low concentric portion 301. The cycle is initiated by throwing a manually actuable lever 309, see Figure 3, secured to the upper end of a sleeve 310 keyed or otherwise clamped to a shaft 311 rotatably mounted in a bearing 312 projecting upwardly from the base plate 118. The lower end of the shaft 311 has secured thereto an arm 313 having its ball end received in a notch in a rod 314 slidable through the base 118. As seen in Figure 15, the rod 314 is provided on its inner end with a second notch receiving the ball end of a lever 315, keyed or otherwise secured to a rock shaft 316. The rock shaft 316, see Figure 17, in addition has loosely journaled thereon a second arm 317. The arm 315 has projecting from one side thereof a pin 318 received in a notch 319 formed in the stem 320 of the valve member 182 as seen in Figure 15. The loose lever 317 has projecting therefrom a pin 321 received in a notch 322 in the stem 323 of the valve member 284, as seen in Figure 16. The lever 317 has projecting therefrom a wing 324 which is adapted to engage a shoulder 325 on the lever 315.

By this construction operation of the handle 309 in a clockwise direction about the axis of the sleeve 310 and shaft 311 axially shifts the rod 314 to the left as seen in Figure 3. This movement of the rod 314 is to the right, as seen in Figure 15, for oscillating the arm 315 in a counterclockwise direction. The movement of the arm 315 through the wing 324 correspondingly actuates the lever 317. The combined movement of the arms or levers 315 and 317 through their respective pins 318 and 321 simultaneously shift the valve members 284 and 182 to the positions shown in the drawings. At this time the machine is set in motion and the jack 187 and rotary motor 289 are actuated as above described to effect a stock removal from the work.

As was mentioned above, the cam makes one complete revolution and then stops to permit a replacement of the work. This stopping is effected automatically by the mechanism disclosed in Figures 10, 17 and 19. In addition to showing the stopping mechanism, these views also disclose the means for determining the positions of the said valves. As seen in Figure 10, the shaft 298 has loosely mounted thereon adjacent the worm wheel 297 a plate member 326 having formed at one end a trigger 327 and at the other end a lug 328. The lug 328 has connected therewith one end of a spring 329, the other end of which is anchored at 330 to the adjacent face of the worm wheel 297. Projecting from the said face of the worm wheel 297 is a pair of pins 331 and 332, the latter of which normally limits the amount of independent oscillation or rotation given to the plate 326 by the spring 329.

As seen in Figure 10, the rock shaft 316 lies above and to one side of the worm wheel shaft 298 and between said shafts is an intermediate shaft 333. Secured to the end of the rock shaft 316, opposite to that which carries the levers 315 and 317, is a valve actuator 334 in the nature of an inverted U-shaped member having depending arms 335 and 336. Disposed between the said arms, with considerable lost motion therebetween, is the ball end 337 of a valve actuator and latch member 338 which is mounted on the intermediate shaft 333. Adjacent the valve actuator 338 the shaft 333 carries a detent member 339 which has formed therein a pair of notches 340 and 341 cooperating with the cam shaped end 342 of pivotally mounted yieldably actuated detent member 343. As will be noted from Figure 17, the detent plate 339 and the valve actuator are loosely mounted on the intermediate shaft 333, and that the said detent plate and valve actuator are connected to one another by means of a pin 342' to move and operate as a unit.

The valve actuator and latch member 338 is provided at its lower end with an interference point 344 which cooperates with the nose 327 on the plate member 326.

The operation of the mechanism just described is as follows: At the commencement of the cycle of operation the plate 326 is actuated by the spring 329 to cause the nose 327 of said plate to engage with the pin 332. These parts remain in this relation during substantially the full rotation of the worm wheel 297 and the cam 298. However, just prior to the conclusion of the cycle or when the cam and its following roll 306 reach the position shown in Figure 12 the nose 327 of the plate 326 engages the interference point 344 of the valve shifter member 338 and this, of course, holds the plate 326 against further movement with the worm wheel 297 and thereby expands the spring 329. This independent movement of the worm wheel 297 continues until the pin 331 engages with the plate, whereupon the parts continue to rotate as a unit. This further movement, however, causes the plate 326 to oscillate or rotate the valve shifter member 338 and detent plate 339 as a unit in a clockwise direction, as seen in Figure 10. The positive movement of the valve shifter 338 continues until the detent 339, which is also a load and fire dog, has its apex slightly beyond the nose 342 of the detent or firing dog 343, whereupon the interference point 344 is passed by the nose 327 of the plate 326 to take its normal position, that determined by the worm wheel 297. The clockwise oscillation of the valve shifter 338 through its ball end 337 effects the counterclockwise movement of the valve actuator 334 for correspondingly oscillating or rocking the rock shaft 316 and therefore the lever 315, and shifting through its pin 318 the valve member 320. This movement of the lever releases the second lever 317 by withdrawing the wing 324. The lever 317, however, is oscillated in the same direction as the lever 315 by means of a spring 345, having one end connected to a lug 346 projecting from the said lever 317, and its other end anchored to a fixed part of the machine. This movement of the valve members 182 and 284 to their second position, of course, effects the stopping of any further movement of the carriage 128. It should be noted that at this time the follower roller 306 is on the low concentric portion 301 of the cam and therefore the carriage is fully retracted.

This machine is adapted to operate on a number of different sizes and types of work pieces, which sizes and types of work pieces vary as a unit in that certain of them may have more or less stock thereon to be removed than others. From this it follows that the time elapsed during a complete cycle of the machine may be too long for all of the work pieces except those having but the predetermined maximum amount of stock to be removed. This would result in a machine incapable of efficient production on the said work pieces except those with the before mentioned maximum amount of stock to be removed. There has, therefore, been provided in this machine means for varying the fundamental cycle, that is, the elapsed time during the infeed and retraction of the grinding wheel carriage. This means includes the valve mechanism 153 of Figure 20 which is structurally shown in Figure 14 and fully described above.

The valve member 162 of said valve mechanism 153 has therefore two positions, the first or normal position being that shown in Figures 20 and 14 and the second position being one to the right as shown in Figure 20, or vertical to the position shown in Figure 14. In order to shift the valve member 162 to its operative position, there is projecting therefrom a valve stem 347 which has formed therein a notch receiving a finger 348 of a valve shifter lever 349. The lever 349 is pinned or otherwise secured to a short shaft 350 rotatably or oscillatably journaled in bearings in the valve block 154. The other end of the shaft 350 has secured thereto a valve actuator 351, see Figures 12 and 13. The actuator 351 is provided on one side of the shaft 350 with a wing 352 and on the other side of said shaft with a detent plate 353 having formed therein notches 354 and 355. The notches 354 and 355 cooperate with a spring pressed detent or dog 356 and together determine the two operative positions of the valve member 162. The wing 352 of the valve actuator 351 is adapted to be successively engaged by dogs 357 and 358 adjustably secured to the cam 298 or a dog carrier 359, in turn secured to the cam as seen for example in Figure 13.

The dogs 357 and 358 are positioned at points which determine the engagement of the wheel with the work, and the point at which the wheel leaves the work. In other words, instead of slowly infeeding the grinding wheel for the entire portion 303 of the cam the dog 358 permits this movement at a relatively rapid rate to a point nearer to the point 304 on the cam, thereby in effect materially reducing the effective portion of the cam periphery. Again it may not be necessary to hold the wheel and work in a sparking out position for the whole of the portion 305 of the cam, and the second dog 357 will be adjusted for rendering a portion thereof inoperative. In other words, the dogs 357 and 358 determine the length of the feeding and sparking out cycle and cause the rotary motor 289 to operate at a rapid rate during the balance of the cycle.

In order to appreciate just what occurs it will be assumed that the sparking out operation has just about reached its end, at which time the dog 357 shifts the valve member 162 through the valve shifter 351 and valve shifter lever 349 to its right hand position as seen in Figure 20, thereby connecting the pump pipe or conduit 152 through the ports 159 and 158 with the pipe or conduit 169 and the motor 289. The exhaust from the said motor is then connected through the pipes or conduits 172 and 171, valve ports 156 and 157, pipes or conduits 173 and 272, low pressure relief valve 191 and pipe or conduit 192 to the sump 149. From this it will be seen that the throttle and balanced valve mechanisms 221 and 255 are by-passed, thereby effecting the rapid rotation or operation of the motor 289.

The foregoing fully describes the physical circuit and control valves and mechanisms employed in the operation of the grinding wheel carriage about the pivot or trunnion 123. It is believed that the circuit for driving or rotating the work driving motor 294 is self-evident from Figure 20. However, a brief description thereof will now be given.

As seen in Figure 20, the variable delivery pump, which incidentally is utilized solely for operating the work motor 294, has its discharge side connected by the pipe or conduit 290 with the main control valve mechanism 271 where it is connected with the pipe or conduit 292 to the intake of the motor 294. The exhaust pipe or conduit 293 from the motor 294 is connected through the valve mechanism 271 with the pipe or conduit 291 and through the pipes or conduits 272 and 173 with the intake side of the variable delivery pump 174. From this it will be seen that the circuit to the motor 294 from the pump 174 is a comparatively closed circuit for effecting the rotation of the work. It should be noted, however, that the pipe 272 which is the normal return pipe or conduit is connected into the return pipe or conduit 173 of the variable delivery motor 174 and is utilized for keeping the said variable delivery pump circuit at all times charged and in full operation.

The work supporting table or slide is actuated by the hydraulic reciprocating motor, including the cylinder 44 and piston 45 as above described. The circuit for effecting the operation of the reciprocating hydraulic motor is shown in Figure 20 and comprises the pipe or conduit 186 which extends from its branch pipe or conduit 185 and terminates in the valve mechanism 188. This valve mechanism 188 is shown structurally in Figure 8 and comprises a valve bushing 360 pressed into a valve block 361 secured to the under surface of bed plate or slide 38. The bushing 360 is provided therethrough with a plurality of sets of radial ports 362, 363, 364, 365 and 366, each set being encircled by a similar circumferential groove 367. Disposed within the bore in the bushing 360 is a valve member 368 having formed thereon a plurality of piston portions for forming therebetween cannelures 369 and 370 adapted to connect the radial ports in different combinations as effected by the two positions of the valve member 368.

As seen in Figure 20, the ports 362 and 366 have respectively connected therewith pipes or conduits 371 and 372 extending from the pressure conduit 186. The ports 364 have connected therewith one terminus of a pipe or conduit 373 which has its other end connected to the pipe or conduit 192 which terminates in the sump or tank 149. The remaining ports 363 and 365 have respectively connected therewith one terminus of pipes or conduits 374 and 375 which terminate at their other ends in the right and left hand ends of the cylinder 44.

As was suggested above, the valve member 368 has three operative positions, a neutral or normal position as shown in the drawings and an operative position to either side thereof. In order to shift the valve member 368 it has formed therein a notch 376 receiving the ball end 377 of a lever 378, keyed or otherwise secured to a shaft 379 which is mounted in suitable bearings provided by the block 361 and has its axis extending substantially parallel to the direction of extent of the work and slide. The shaft 379 extends beyond the bracket or block 361 to which projection is secured an operating handle 380.

From the foregoing it will be appreciated that oscillation of the handle in either direction from that shown in Figures 1 and 3 will correspondingly oscillate the valve shifter arm 378 and therefore the valve member 368. Contacting with each end of the valve member 368 is a spring pressed plunger 381 and 382 which materially assist in effecting a movement of the valve member 368 by the handle 380.

By reference to Figure 20 it will be seen that if the valve member 368 is shifted to the right, the pipes or conduits 374, 272 and 186 will be connected, thereby delivering fluid to the right hand face of the piston and effecting its movement to the left. It will also be noted that if the valve member were shifted in the reverse direction, namely, to the left, the conduits 375, 371 and 186 will connect the pressure to the right hand side of the piston for actuating the same toward the right. In order to control the rate of travel of the piston there is provided in the pipe or conduit 186 an adjustable check valve 383, this valve causing the piston to travel at a very slow rate of speed as the piston is utilized primarily for actuating a trueing tool relative to the grinding wheel as will shortly be described in detail.

As will be seen in Figure 3, the work being operated upon is the inner race member of an anti-friction roller bearing and has two operations performed thereon, the raceway itself and the flange which takes the end thrust of the anti-friction rollers. From this it will be seen that the wheel must be accurately shaped and have both surfaces 384 and 385 true and these surfaces must bear a true right angle to one another. The mechanism for effecting the said trueing of the wheel is shown in detail in Figure 8, and as there shown, comprises a bracket 386 which is bolted to the base plate or slide 38. The slide 38 is provided with a pair of ears 387 and 388 having formed therethrough concentric bores for an axle 389. The axle 389, in addition, extends through a bore in the swingable carrier 390 whereby the bracket may be positioned vertically as seen in Figure 8 or may be laid down on the bed plate carriage 38 as shown in Figure 3. In order to hold the carrier 390 in either its upright position, as shown in Figure 8, or in its inoperative position in Figure 3 the axle 389 is provided on one end with threads 399 receiving a handle nut 400 which when actuated to the clamping position securely clamps the carrier 390 between a shoulder on the axle 389 and the handle nut 400.

The carrier 390 is provided on its upper end with a barrel bearing 391 in which is mounted for axial movement relative thereto a diamond or trueing bar 392. The rear end of the bar 392 is provided with a tap bore 393 receiving the threaded end of an adjusting screw 394. The screw 394 is mounted for rotary, but not axial movement, in a bearing member 395 threaded into the bore through the barrel bearing 391.

The screw 394 projects beyond the bearing member 395 to which projection is secured a hand wheel 396, whereby the diamond bar 392 may be actuated relative to the bearing 391. On this forward end the diamond bar 392 has secured a trueing tool or diamond 397 which is substantially on the axis of the bar 392, while projecting laterally from the side of said bar is a second trueing tool or diamond 398. As will later be made clear, the diamond or trueing tool 397 is utilized for trueing the face 384 of the grinding wheel while the diamond 398 is employed for correspondingly trueing the face 385 of the wheel.

The grinding wheel is trued when it is in its upper or fully infed position, the position shown in Figure 9, which of course is the position at which time the work is to its final desired size. In order to indicate when the carriage is at this position the worm wheel shaft 298 projects beyond the bed plate 38, to which projection is secured a pointer 401, see Figure 21, which cooperates with a marker 402 on the cover plate of the bed plate. In order to stop the movement of the carriage in this position to substantially hydraulically lock same in this position the valve mechanism 168 is actuated independently of the valve mechanism 271. To effect this operation of the valve mechanism 168 the arm 315 which actuates the valve member 182 has projecting therefrom a lug 403 which overlies a vertically shifted pin 404. The pin 404 at its lower end contacts with a cam or flattened portion 405 formed on the inner end of the intermediate shaft 333 above referred to. From this it will be seen that the shaft 333 has a function other than merely being a support for the valve actuating lever 338 and detent plate 339, but is also used for the actuation of a valve to stop the oscillation of the carriage in its uppermost or trueing position. In order to actuate the shaft 333 it projects beyond the bed plate 38 to receive a handle 406. By reference to Figure 21 it will be seen that the handle 406 lies closely adjacent the pointer 401 and is so arranged that the operator may observe the pointer 401 and as soon as it registers with the marker 402 stop the further oscillation of the carriage.

When the carriage is in its uppermost position, that shown in Figure 9, the valve mechanism 188 is actuated to effect the operation of the piston 50 45, thereby traversing the trueing mechanism across the face of the grinding wheel and effecting the trueing of the wheel face 384 by the diamond 397. This movement of the parts is limited by a stop pin 407 which projects from the slide engaging an adjustable abutment 408, here shown in the form of a screw extending through a block 409 adjustably secured in a T slot 410 formed in the forward face of the base plate 38. The relation between the stop pin 407 and abutment 408 is such that upon contact thereof the trueing tool or diamond 397 has reached the apex between the sides or faces 384 and 385 of the grinding wheel and the face 384 has therefore been completely trued. At this time the hand wheel 396 is rotated for correspondingly rotating the screw 394 and axially actuating the diamond bar 392 to cause the second trueing tool or diamond 398 to traverse the second frace 385 of the grinding wheel and thereby effect its trueing. Due to the relationship between the parts this results in the grinding wheel faces 384 and 385 being at the proper relation to one another, namely a right angle for properly grinding the race way and thrust collar on the bearing shown in the drawings.

The position of the work slide to properly align the work with the grinding wheel is established by the pin 407 projecting from the slide cooperating with a second abutment 411 which, similar to the abutment above described, includes a block 412 adjustably secured to the forward face of the slide through a T slot 413.

It is believed that the operation of the present machine will be fully understood from the foregoing description and it will be noted that there has been provided a machine adapted to produce accurately formed work pieces in an expeditious manner and in a minimum of time.

What is claimed is:

1. In a grinding machine of the class described the combination of a bed, a work support on said bed, a grinding wheel carriage on said bed rotatably supporting a grinding wheel, means pivotally connecting the carriage to the bed, and a pair of hydraulic motors for sequential operation for effecting the oscillation of the grinding wheel carriage about its pivot, and a single source of hydraulic pressure for effecting the said sequential operation of the motors.

2. In a grinding machine of the class described the combination of a bed, a work support on said bed for supporting a work piece for rotation about a predetermined axis, a grinding wheel carriage pivotally mounted on the bed for oscillation toward and from the work at rapid and slow speeds to effect a stock removal from the work, hydraulic means for effecting the rapid oscillation of the carriage, and additional hydraulic means for effecting the slow oscillation of the carriage.

3. In a grinding machine of the class described the combination of a bed, a work support on said bed for supporting a work piece for rotation about a predetermined axis, a grinding wheel carriage pivotally mounted on the bed for oscillation toward and from the work at rapid and slow speeds to effect a stock removal from the work, hydraulic means for effecting the rapid oscillation of the carriage, additional hydraulic means for effecting the slow oscillation of the carriage, and hydraulic means for effecting the rotation of the work.

4. In a grinding machine of the class described the combination of a bed, a work support on said bed for supporting a work piece for rotation about a predetermined axis, a grinding wheel carriage pivotally mounted on the bed for oscillation toward and from the work at rapid and slow speeds to effect a stock removal from the work, hydraulic means for effecting the rapid oscillation of the carriage, additional hydraulic means for effecting the slow oscillation of the carriage, hydraulic means for effecting the rotation of the work, and a single source of hydraulic pressure for effecting the sequential and simultaneous operation of the said hydraulic means.

5. In a grinding machine of the class described the combination of a bed, a work support on said bed for supporting a work piece for rotation about a predetermined axis, a pivotally mounted carriage rotatably supporting a grinding wheel, a hydraulically actuated jack for oscillating the carriage at a rapid rate about its pivot to effect engagement between the grinding wheel and the work, and an hydraulically actuated motor for further oscillating the grinding wheel carriage about its pivot to feed the grinding wheel into the work to effect a stock removal therefrom.

6. In a grinding machine of the class described the combination of a bed, a work support on said bed for supporting a work piece for rotation about a predetermined axis, a pivotally mounted carriage rotatably supporting a grinding wheel, a hydraulically actuated jack for oscillating the carriage at a rapid rate about its pivot to effect engagement between the grinding wheel and the work, an hydraulically actuated motor for further oscillating the grinding wheel carriage about its pivot to feed the grinding wheel into the work to effect a stock removal therefrom, and a hydraulic motor for effecting the rotation of the work.

7. In a grinding machine of the class described the combination of a bed, a work support on said bed for supporting a work piece for rotation about a predetermined axis, a grinding wheel carriage pivotally mounted on the bed for oscillation toward and from the work at rapid and slow speeds to effect a stock removal from the work, hydraulic means for effecting the rapid oscillation of the carriage, additional hydraulic means for effecting the slow oscillation of the carriage, hydraulic means for effecting the rotation of the work, a single source of hydraulic pressure for effecting the sequential and simultaneous operation of the said hydraulic means, a hydraulic motor for effecting a translation of the work support relative to the bed, and a single source of hydraulic pressure for actuating the hydraulic jack, the grinding wheel carriage motor and the table translating motor.

8. In a grinding machine of the class described the combination of a bed, a work support mounted on said bed, a pivotal carriage mounted on the bed, means on the work support for rotating the work about a predetermined axis, a hydraulic mechanism for oscillating the grinding wheel carriage toward the work at a rapid rate to effect engagement between the grinding wheel thereon and the work and an independent hydraulic mechanism for further oscillating the grinding wheel carriage to effect a stock removal from the work, a single source of pressure for sequentially operating the independent hydraulic mechanisms, a valve for connecting and disconnecting the hydraulic pressure with the hydraulic mechanisms, and manual means for actuating said valve to initiate the movement of the carriage.

9. In a grinding machine of the class described the combination of a bed, a work support mounted on said bed, a pivotal carriage mounted on the bed, means on the work support for rotating the work about a predetermined axis, a hydraulic mechanism for oscillating the grinding wheel carriage toward the work at a rapid rate to effect engagement between the grinding wheel thereon and the work and an independent hydraulic mechanism for further oscillating the grinding wheel carriage to effect a stock removal from the work, a single source of pressure for sequentially operating the independent hydraulic mechanisms, a valve for connecting and disconnecting the hydraulic pressure with the hydraulic mechanisms, manual means for actuating said valve to initiate the movement of the carriage, and automatic means for reversely actuating said valve to stop the movement of the hydraulic means.

10. In a grinding machine of the class described the combination of a bed, a work support mounted on said bed, a pivotal carriage mounted on the bed, means on the work support for rotating the work about a predetermined axis, a hydraulic mechanism for oscillating the grinding wheel carriage toward the work at a rapid rate to effect engagement between the grinding wheel thereon and the work and an independent hydraulic mechanism for further oscillating the grinding wheel carriage to effect a stock removal from the work, a single source of pressure for sequentially operating the independent hydraulic mechanisms, a valve for connecting and disconnecting the hydraulic pressure with the hydraulic mechanisms, manual means for actuating said valve to initiate the movement of the carriage, automatic means for reversely actuating said valve to stop the movement of the hydraulic means, and means for actuating the work support in two directions transversely of and toward and from the grinding wheel.

11. In a grinding machine of the class described the combination of a bed, a work support mounted on said bed, a pivotal carriage mounted on the bed, means on the work support for rotating the work about a predetermined axis, a hydraulic mechanism for oscillating the grinding wheel carriage toward the work at a rapid rate to effect engagement between the grinding wheel thereon and the work and an independent hydraulic mechanism for further oscillating the grinding wheel carriage to effect a stock removal from the work, a single source of pressure for sequentially operating the independent hydraulic mechanisms, a valve for connecting and disconnecting the hydraulic pressure with the hydraulic mechanisms, manual means for actuating said valve to initiate the movement of the carriage, automatic means for reversely actuating said valve to stop the movement of the hydraulic means, hydraulic means for effecting the transverse movement of the work support relative to the grinding wheel, and mechanical means for actuating the work support toward and from the grinding wheel.

12. In a grinding machine of the class described the combination of a bed, a work support mounted on said bed, a pivotal carriage mounted on the bed, means on the work support for rotating the work about a predetermined axis, a hydraulic mechanism for oscillating the grinding wheel carriage toward the work at a rapid rate to effect engagement between the grinding wheel thereon and the work and an independent hydraulic mechanism for further oscillating the grinding wheel carriage to effect a stock removal from the work, a single source of pressure for sequentially operating the independent hydraulic mechanisms, a valve for connecting and disconnecting the hydraulic pressure with the hydraulic mechanisms, manual means for actuating said valve to initiate the movement of the carriage, automatic means for reversely actuating said valve to stop the movement of the hydraulic means, hydraulic means for effecting the transverse movement of the work support relative to the grinding wheel, mechanical means for actuating the work support toward and from the grinding wheel, and cooperating dog means carried by the work support and bed for limiting the transverse movement of the work support and accurately positioning the work support with respect to the grinding wheel.

13. In a grinding machine of the class described the combination of a work support for rotatably supporting a work piece, a grinding wheel carriage pivotally mounted adjacent the work support for oscillation toward and from the work support, a rotatable cam having a connection with the carriage for effecting said oscillation, said cam effecting the oscillation of the carriage at a rapid rate toward the work to effect engagement of the grinding wheel with the work, at a slow rate to effect a stock removal from the work, at a rapid rate from the work to permit a replacement of the work and for effecting a dwell in the movement of the parts during the feeding movement and rapid retraction, means for automatically stopping the movement of the parts upon retraction thereof, and means for rendering certain of the steps in the cycle inoperative.

14. In a grinding machine of the class described the combination of a bed, a work support on said bed, a grinding wheel support on said bed, a rotatable cam for effecting a cyclic movement of one of said supports toward the other at a rapid rate, a slow feeding rate, a rapid separation and effecting a dwell between the slow feeding rate and the rapid retraction, means for stopping the rotation of the cam after the rapid retraction, and dog means for rendering portions of the cycle inoperative and thereby varying the duration of time during which the cyclic movement of the parts takes place.

15. In a grinding machine of the class described the combination of a bed, a work support on said bed, a grinding wheel support on said bed, a rotatable cam for effecting a cyclic movement of one of said supports toward the other at a rapid rate, a slow feeding rate, a rapid separation and effecting a dwell between the slow feeding rate and the rapid retraction, means for stopping the rotation of the cam after the rapid retraction, dog means for rendering portions of the cycle inoperative and thereby varying the duration of time during which the cyclic movement of the parts takes place, and means for effecting a movement of the second support toward and from the oscillatable support.

16. In a machine tool organization the combination of a bed, a pair of supports on said bed and movable through planes at right angles to one another, independent hydraulic motors for effecting the independent movement of said supports, a single source of hydraulic pressure for effecting the operation of said motors, an independent reversing valve for each of said motors for controlling the direction of operation thereof, independent throttle means for each of said motors to control the rates of operation thereof, means for effecting a basic predetermined cycle of operation of one of said motors, and additional adjustable means cooperating therewith for modifying said predetermined cycle.

17. In a machine tool organization the combination of a bed, a pair of supports on said bed and movable through planes at right angles to one another, independent hydraulic motors for effecting the independent movement of said supports, a single source of hydraulic pressure for effecting the operation of said motors, an independent reversing valve for each of said motors for controlling the direction of operation tors for controlling the direction of operation thereof, independent throttle means for each of said motors to control the rates of operation thereof, means effective on one of said motors to successively produce the prescribed basic cycle of movement thereof, and supplemental adjustable means effective to by-pass the cyclic control mechanism whereby rapid traverse is imparted to the motor irrespective of the reaction of the cyclic control means thereof.

LESTER F. NENNINGER.
FREDERICK S. HAAS.